United States Patent [19]

McKenzie

[11] 4,129,068
[45] Dec. 12, 1978

[54] CITRUS SLICING APPARATUS

[75] Inventor: Elton L. McKenzie, Auburndale, Fla.

[73] Assignee: FMC Corporation, San Jose, Calif.

[21] Appl. No.: 798,290

[22] Filed: May 19, 1977

[51] Int. Cl.² ............................................. A23N 4/12
[52] U.S. Cl. ......................................... 99/538; 99/557
[58] Field of Search .................. 99/537, 538, 544, 545, 99/557, 558, 549, 542, 543; 426/484

[56] References Cited

U.S. PATENT DOCUMENTS

| | | | |
|---|---|---|---|
| 2,958,353 | 11/1960 | Ogelvie | 99/544 |
| 3,072,160 | 1/1963 | Grotewold | 99/538 |
| 3,696,847 | 10/1972 | Erekson | 99/545 |

*Primary Examiner*—Leonard D. Christian
*Attorney, Agent, or Firm*—R. S. Kelly

[57] ABSTRACT

A citrus slicing machine wherein a whole peeled citrus fruit (e.g., a grapefruit) is placed on an upright spindle with its core oriented in a vertical direction. A plurality of uniformly circumferentially spaced blades, which are mounted on an overlying head, are then reciprocated vertically through the fruit to slice it into a plurality of uniform segments. The blades are flat in the vertical plane and extend outwardly from the bottom upwardly so that they cut the fruit from the interior to the outside thereof. The blades are arranged in non-radial orientations with respect to the axial core of the fruit so that they slice across the radially extending membranes of the fruit to provide pleasing and attractive fruit slices for the ever popular fruit salads or the like.

6 Claims, 16 Drawing Figures

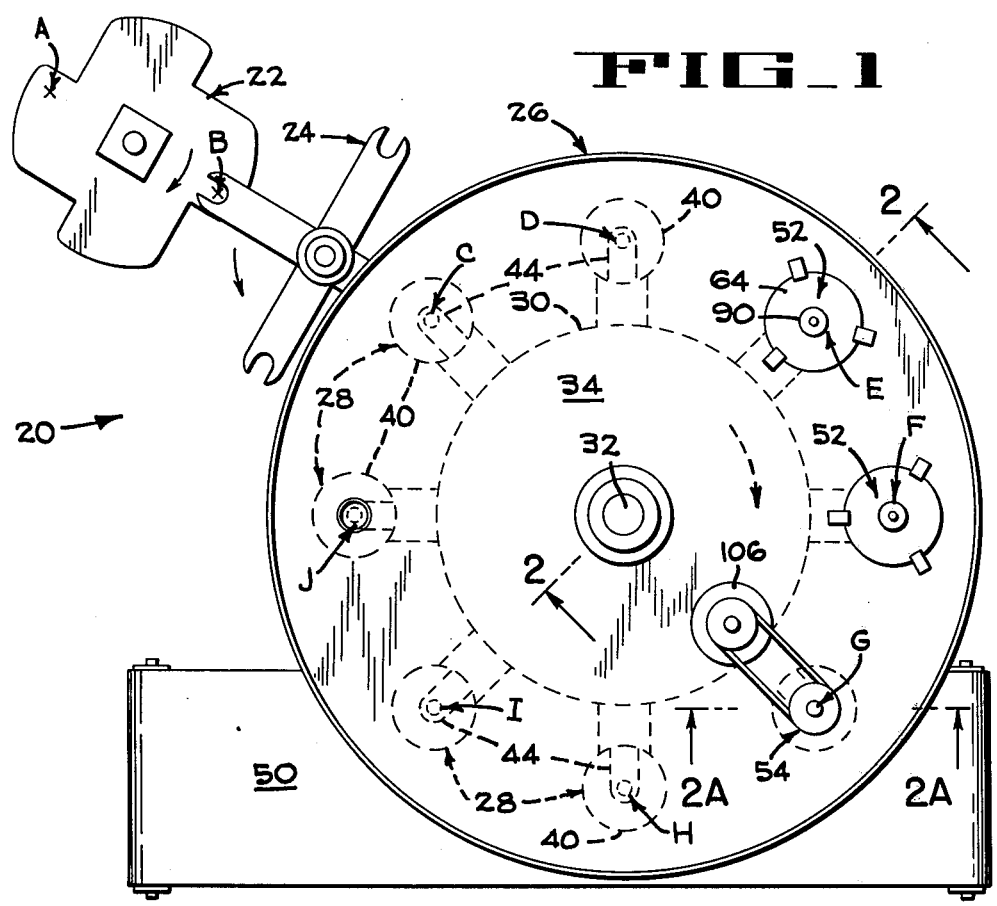
FIG_1
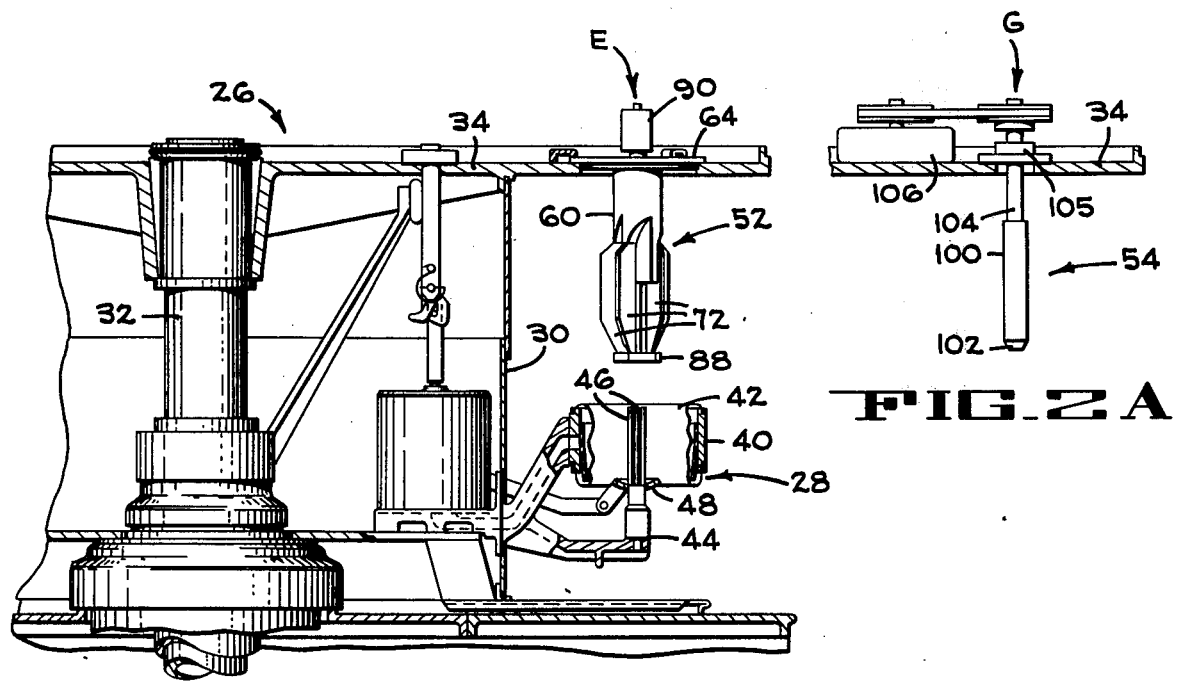
FIG_2  FIG_2A

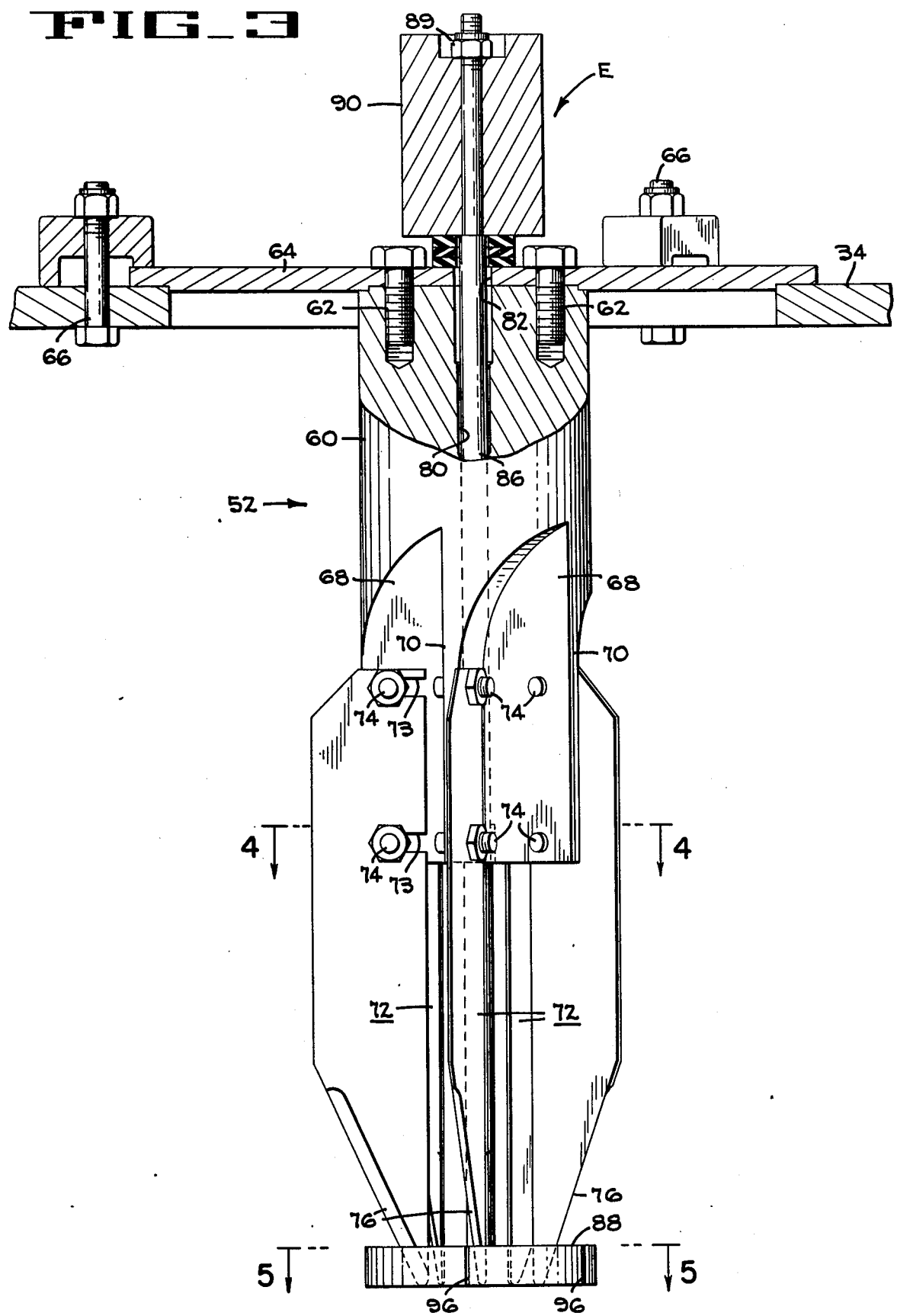

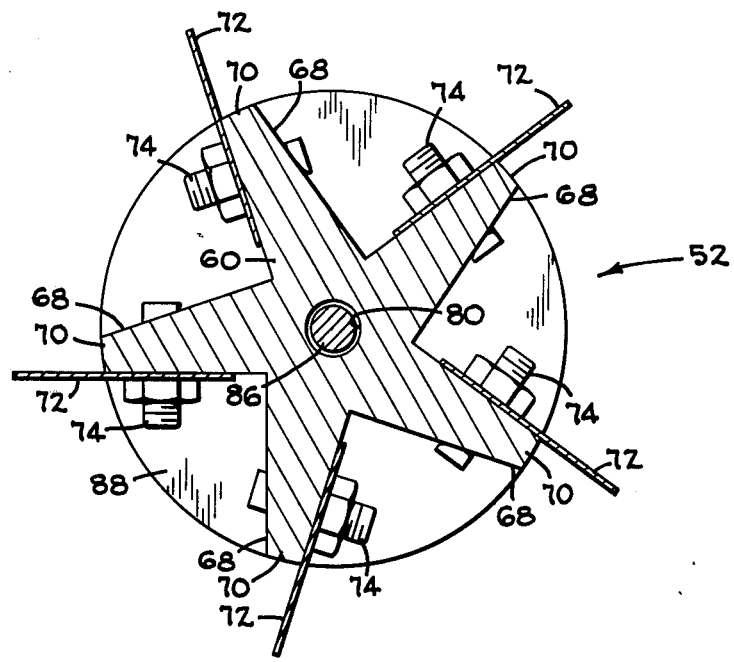
FIG_4
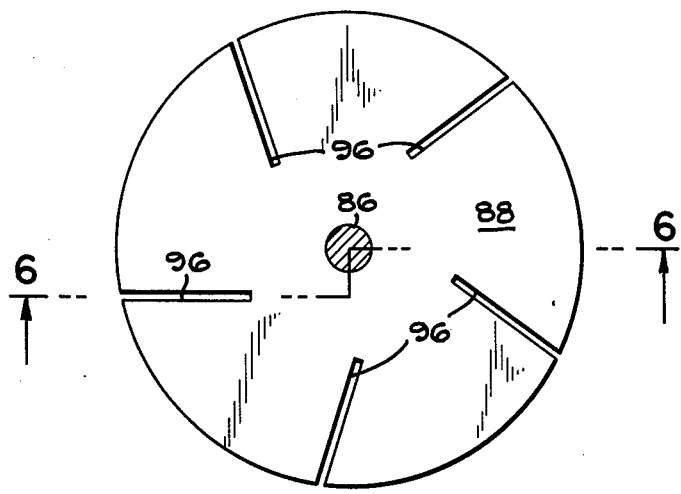
FIG_5
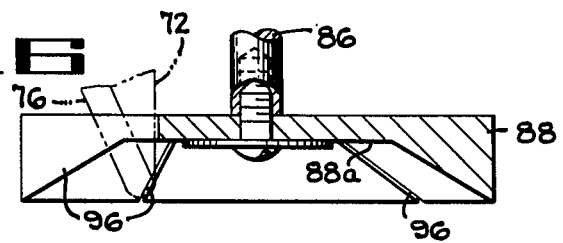
FIG_6

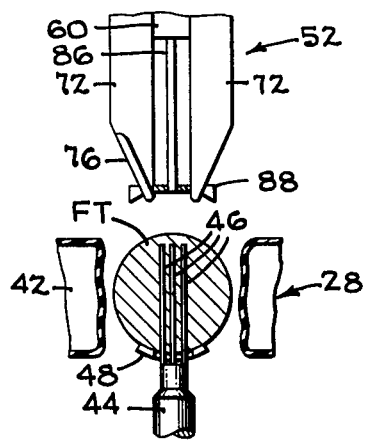
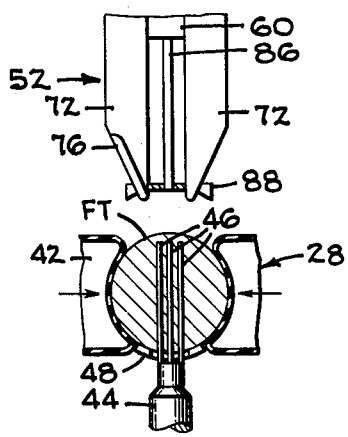
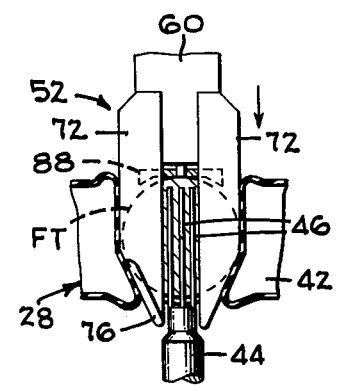
FIG_7   FIG_8   FIG_9
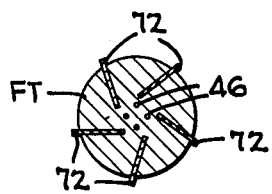
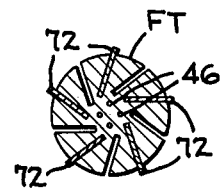
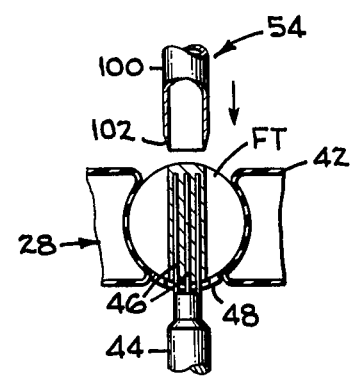
FIG_10   FIG_11   FIG_12
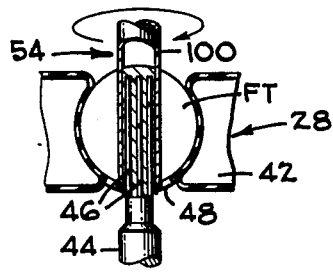
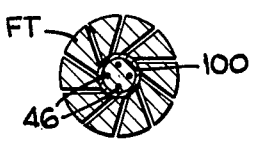
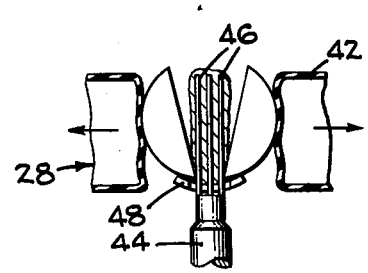
FIG_13   FIG_14   FIG_15

CITRUS SLICING APPARATUS

BACKGROUND OF THE INVENTION

1. Field of the Invention

The present invention pertains to apparatus for sectionizing citrus fruit, and more particularly, it concerns an apparatus for rapidly and efficiently slicing citrus fruit into small, wedge-shaped sections such as might be used in fruit salads or the like.

2. Description of the Prior Art

The meat, or juice bearing, portion of a citrus fruit is comprised of groups of interconnected juice sacs with each group being in the form of a segmental section which is surrounded by a membrane. The portions of the segment wall which extend more or less radially from the pithy core of the whole fruit and define the planar faces of the segment are referred to as radial membranes and intersect at the apex of the segment, while the portion of the segment wall which lies adjacent the outer peel of the fruit and defines the spherical face of the segment is called the outer membrane.

In the citrus fruit processing industry, "sectionizing" is normally referred to as an operation by which the naturally shaped, membrane free meat segments are removed from the citrus fruit, particularly grapefruit, and this operation can basically be performed by first removing the outer peel (albedo and flavedo) from the fruit, placing the peeled fruit in a fruit holder, cutting paths in the outer membrane through which cutting blades can be inserted, and finally cutting along the inner surfaces of the radial membranes to free the meat segments from their surrounding membranes. A machine which has achieved widespread commercial use for accomplishing the aforedescribed procedure is shown in prior U.S. Pat. No. 3,072,160 to Grotewold, issued Jan. 8, 1963.

While the aforedescribed citrus sectionizing operation is widely utilized in the citrus processing industry, it will be noted that the machinery for accomplishing the operation is relatively complex and expensive since the various sectionizing, or cutting, blades must be flexibly mounted so that they may rotate relative to the axial core of the fruit in order to "find" the membranes before they can cut a path through the fruit that will be directly adjacent to a membrane. Also, since cuts must be made on both sides of all of the radially projecting membranes of the fruit, a considerable number of cutting operations must be performed in order to completely free the meat segments.

Less complex mechanisms have, of course, been utilized in the past for segmentizing or slicing citrus fruit, but such mechanisms have generally not provided fruit sections which are commercially acceptable. One such prior art mechanism is shown in U.S. Pat. No. 2,629,168 to Shpentuk, issued on Feb. 24, 1953. This mechanism includes a plurality of uniformly spaced, radially extending cutting blades which are fixed in place upon a manually operable cutting head. While mechanism is adapted for cutting grapefruit halves so they may be eaten by a spoon in the conventional manner, it would not be useful for commercial operation since the cutting blades would not necessarily follow the membranes; thus, in the instances where the cutting paths were spaced slightly from the membranes during penetration of the fruit, very ragged and unattractive segments would result from the cutting operation.

SUMMARY OF THE INVENTION

With the apparatus of the present invention, a new concept in commercial citrus fruit sectionizing has been developed which produces commercially acceptable citrus fruit sections, such as might be used by the fruit salad industry, but which requires considerably simpler and less expensive machinery than that heretofore utilized. The apparatus of the present invention generally comprises a reciprocating head which is adapted to act upon a whole peeled citrus fruit which has been oriented into a position wherein its core, i.e., the stem-blossom axis, is vertical. The head carries a plurality of uniformly circumferentially spaced blades which are rigidly fixed in position so that they cut paths through the citrus fruit which are flat in the vertical plane.

A key feature of the present invention is the fact that the blades are arranged in non-radial positions with respect to the axial core of the citrus fruit which has previously been aligned parallel of the reciprocating paths of the blades. Thus, each of the radially extending membranes of the fruit will be cut through along a path which lies at a relatively wide angle thereto, and no cut will be made in a position closely parallel to, or nearly parallel to, a membrane so as to result in a ragged cut or leave an exposed membrane to thereby decrease from the attractiveness of the segment.

In the preferred form in the invention successive cuts by a plurality of blades may be made at separate processing stations so that a considerable number of segments can be produced from one single fruit without requiring an excessive number of blades to be mounted on a single processing head so as to unduly compress and squeeze the fruit during the cutting operation. Also, it is preferred to use a generally cylindrical core cutter to cut out the pithy core and seeds adjacent the stem-blossom axis of the fruit after the sectionizing cuts have been made in order to complete the processing operation; however, it is within the scope of the present invention to utilize only the slicing operation of the blades to automatically provide a completed cut about the core of the citrus fruit.

BRIEF DESCRIPTION OF THE DRAWINGS

FIG. 1 is a diagrammatic plan view of the citrus slicing apparatus of the present invention.

FIG. 2 is an enlarged section taken generally along the line 2—2 of FIG. 1.

FIG. 2A is a section taken along the line 2A—2A of FIG. 1.

FIG. 3 is an enlarged side elevation, partially in section, of one of the slicing heads of the apparatus shown in FIG. 2.

FIG. 4 is an enlarged section taken along the line 4—4 in FIG. 3.

FIG. 5 is an enlarged section taken along the line 5—5 of FIG. 3.

FIG. 6 is a section taken along the line 6—6 of FIG. 5.

FIGS. 7 to 15 are diagrammatic operational views illustrating the sequence of operations performed upon a citrus fruit by the apparatus of the present invention in order to separate the fruit into a plurality of uniform, wedge-shaped segments.

DESCRIPTION OF THE PREFERRED EMBODIMENT

The citrus slicing apparatus 20 of the present invention is diagrammatically illustrated in plan in FIG. 1 and will be seen to basically include a feed turret 22, a transfer turret 24, and the main fruit processing turret 26. Peeled and treated citrus fruit (e.g., grapefruit or oranges) are placed, one at a time, on the feed turret 22 at station A of the turret. The turret 22 is intermittently moved through 90° angular increments in a clockwise direction to ultimately bring each fruit to a transfer station B where the fruit is automatically transferred from the feed turret 22 to the transfer turret 24 which is also arranged to be intermittently moved in 90° increments in synchronism with the movements of the feed turret, but in a counterclockwise direction. The fruit on the transfer turret is then moved to a transfer station C where it is deposited in one of a plurality of fruit carriers 28 (FIG. 2) that are mounted in uniform circumferentially spaced relationship about the main fruit processing turret. Although not shown, each fruit supporting position on the feed turret 22 includes a fruit supporting mechanism comprised of a plurality of pins, or tines, upon which the fruit is impaled so that the pins surround the core thereof. Mechanisms are then provided to accurately align the core of the fruit in a vertical plane, and this orientation is maintained by the transfer turret 24 when the fruit is transferred onto the main fruit processing turret 26. The feed turret 22 and the transfer turret 24 are conventional mechanisms such as shown in U.S. Pat. No. 3,030,990 to Ralph Polk, Jr. and U.S. Pat. No. 3,448,845 to Wilber C. Belk et al. Reference to such prior patents may be had for a more complete description of the structure and operation of such fruit transfer mechanisms.

The main fruit processing turret 26, as pointed out hereinbefore, includes a plurality of fruit carriers 28 (FIG. 2) spaced circumferentially thereabout. The fruit carriers are mounted upon a rotatable housing 30 which is arranged to be intermittently rotated through 45° angular increments in a clockwise direction (FIG. 1) the axis of a center shaft 32 to move the fruit successively into positions of vertical alignment with mechanisms carried by an overlying tool carrier plate 34. The tool carrier plate is non-rotatably mounted atop the center shaft 32 of the processing turret 26 and is arranged for vertical reciprocation thereon so as to move the mechanisms carried thereby into engagement with the fruit at the various lettered stations (FIG. 1) of the turret.

As shown in FIG. 2, each of the fruit carriers 28 is comprised of a generally cylindrical frame member 40 having an inflatable diaphragm 42 secured to the inner face thereof. A fruit supporting arm 44, having a plurality of impaling pins or tines 46 secured to the distal end thereof in vertically upright positions, extends from the housing 30 so as to underlie the frame member 40. The pins 46 extend upwardly through a hemispherically shaped fruit support plate 48 which is adapted to receive the lower end of the citrus fruit with the impaling pins 62 projecting through the fruit directly adjacent to and surrounding the core thereof to maintain the fruit on the support plate in a fixed position while the segments are sliced therefrom. By means not fully disclosed herein, the diaphragm 42 is inflated once the fruit is placed upon the pins 46, to secure all portions of the fruit in place during the subsequent slicing operation. The support plate 48 is slotted (see FIGS. 7-15) about the periphery thereof to permit the slicing blades to pass therethrough as they complete their cutting movement. The fruit support plate may be hydraulically and automatically controlled to support the fruit with the top at a predetermined elevation regardless of the size of the fruit. After the fruit has been sliced into the appropriate sections, the diaphragm 42 is deflated to allow the severed sections to drop onto an underlying fruit takeaway conveyor 50 (FIG. 1).

Except for the specific tools which perform the slicing and coring operations upon the fruit, all of the mechanisms of the main fruit processing turrett 26 are conventional and are shown in various prior art patents including U.S. Pat. Nos. 3,275,072 and 3,018,808 to Wilber C. Belk and U.S. Pat. No. 3,072,160 to Hans W. Grotewold. Reference to such prior patents may be had for a more complete description of the various mechanisms of the processing turret and their particular modes of operation.

In the apparatus of the present invention, the particular mechanisms for slicing the citrus fruit into segments are different from those of the prior art and will be described in greater detail hereinafter. First, however, a general description of the operation of the apparatus will be given with particular reference to the diagrammatic plan view of FIG. 1. As previously pointed out, the fruit, with its stem-blossom axis oriented vertically, is transferred from the transfer turret 24 onto one of the fruit carriers 48 at station C. During the next 45° incremental movement of the housing 30, the fruit will be transferred to station D at which time the diaphragm 42 will be inflated to securely hold the fruit in place within the carrier. During the next incremental movement of the processing turret the fruit is transferred to station E wherein a first slicing operation is performed by a slicing mechanism 52 (FIG. 2) to slice the fruit vertically at five uniformly peripherally spaced locations. During the next incremental movement of the turret the fruit is moved to station F wherein a second slicing operation is performed by another slicing mechanism 52 to again slice the fruit in five uniformly spaced locations with such locations lying exactly midway between the first set of cuts. The fruit is then moved to station G wherein a core cutter 54 (FIG. 2A) is moved downwardly to cut a cylindrical path about the core and seeds at the center of the fruit. The fruit is then transferred to station H directly above the take-away conveyor 50 wherein the inflatable diaphragm 42 is deflated to allow the ten severed segments to drop onto the take-away conveyor. The remaining fruit core then moves to station I during the next incremental movement of the processing turret wherein no operation is performed. Subsequently, the core is moved to station J wherein a conventional core stripping mechanism (not shown) is used to strip the core from the upwardly projecting pins 46 to ready the fruit carrier to receive the next whole fruit. Finally, the fruit carrier moves back to station C where a new fruit is received in order to initiate the aforedescribed operation once again. With respect to the core stripping mechanism, it will be appreciated that such device is entirely conventional and is shown and described in detail in the aforementioned U.S. Pat. No. 3,072,160 to Hans W. Grotewold; reference may be had to such patent for a more complete description of the structure and operation thereof.

As pointed out hereinbefore the present invention generally relates to the slicing mechanisms 52 and the coring mechanism 54, all of which are mounted upon the overlying tool carrier plate 34. As previously noted, this plate is vertically reciprocated in timed relationship to the incremental movement of the housing 30 so that the slicing mechanisms 52 and the core cutter 54 will be moved downwardly through the frame members 20 of the fruit carriers 28 to perform their operations. This vertically reciprocating drive movement and the mechanisms for providing it are shown in detail in the aforementioned prior patents to Wilber C. Belk and Hans W. Grotewold, and no further description thereof will be made herein.

One of the fruit slicing mechanisms 52 is shown in detail in FIGS. 3-6 and will be seen to comprise a vertically oriented mounting head 60 which is secured by a plurality of bolts 62 to an overlying support plate 64 (FIG. 3). The support plate, in turn, is bolted by means of bolts 66 directly to the upper surface of the tool 34. At five positions uniformly spaced about the lower end of the mounting head 60 there is provided an angular recess 68. It will be seen that the recesses 68 thereby divide the lower end of the mounting head into five narrow, vertically extending walls 70 (FIG. 4). A cutting blade 72 is bolted to one of the faces of each of the walls 70.

The blades are provided with a pair of slots 73 at their upper ends (FIG. 3) so that they can be directly secured to the walls by means of conventional bolts 74. Each of the blades are straight-backed, high tensile, non corrosive, metal members with sufficient length and width to completely pass through the fruit in the carriers 28, and each blade is provided at the lower end thereof with a sharpened angularly oriented edge 76 so that the fruit will be cut from the interior thereof outwardly.

An axial passage 80 is provided within the mounting head 60 which passage is aligned with an aperture 82 in the tool carrier plate 34 to receive in loosely spaced relationship (FIG. 4) a rod 86 and thereby permit the rod to move freely upwardly and downwardly in the vertical direction. The rod carries a hold-down plate 88 at the lower end thereof which has a recessed surface 88a (FIG. 6) at the lower end thereof to engage the top of the fruit in its carrier and prevent it from being lifted as the blades 72 are retracted. The upper end of the rod 86 is provided with a threaded portion to which a nut 89 is attached, and a hold-down weight 90 and resilient bumper 92 are secured between the nut 80 and the support plate 64 so that the hold-down plate 88 will be located directly at the lowermost edge of the blades 72 when the rod 86 is freely supported upon the tool carrier plate 34 out of contact with the fruit as shown in FIG. 3. It will be noted from FIGS. 5 and 6 that the hold-down plate 88 is provided with a plurality of slots 96 which extend at the same spacial angles as do the blades 72 with respect to the axis of the rod 86; thus, as the slicing mechanism 52 is lowered down onto the fruit, the uppermost surface of the fruit will contact the hold-down plate 88 and halt its downward movement. As the blades 72 continue to move downwardly, they will pass through the slots 96 in the hold-down plate and into the fruit so as to cut the fruit from the interior thereof outwardly. As the blades are passing through the fruit, the hold-down weight 90 will be lifted from the tool carrier plate 34 to provide the requisite downward force on the fruit during the slicing operation. As the tool carrier plate moves upward and the interconnected blades are removed from the fruit, the weight 90 will cause the hold-down plate to rest upon the fruit.

As shown in FIG. 5, the slots 96, which are aligned with the blades, are not radial with respect to the vertical axis of reciprocation, and the fruit will be sliced so that the blades will extend across the radially extending membranes of the fruit at relatively wide angles thereto. This is an important feature of the present invention since no cut will be made closely parallel (or nearly parallel) to any membrane exposed. This is important to insure commercial acceptance of the fruit slices.

It will be understood that the fruit slicing mechanisms 52 are identical except for their relative rotative orientation with respect to the fruit upon which they are operative—such relative rotative orientation being indicated in the operational views of FIGS. 10 and 11.

The core cutter 54, which is shown in FIG. 2A, basically comprises a cylindrical cutter 100 having a sharpened edge 102 at the lower end thereof. The cutter 100 is attached to a shaft 104 which is adapted to be continuously rotated by means of a motor 106 mounted atop the upper surface of the tool carrier plate 34. The shaft 104 is arranged to be supported upon the tool carrier plate by means of a conventional bearing 105. When the tool carrier plate is lowered, the cutter 100 will cut a cylindrical path about the core of the fruit and about the fruit supporting tines which cylindrical path will mate with the inner ends of the paths cut by the various blades 72 of the slicing mechanisms 52 to thereby free the sliced segments from the core and allow them to ultimately drop free to the conveyor 50.

While it is preferred to use the core cutter 54 to delineate the fruit slices, it is possible to eliminate such structure by making the various cuts by the blades 72 long enough so that they overlap one another whereby the core will be automatically eliminated from the segments once the diaphragm 42 is deflated and the segments are allowed to drop free.

The operation of the fruit slicing apparatus 20 of the present invention will now be described with particular reference to operational FIGS. 7-15. As shown in FIG. 7, in the initial stage of the operation the fruit FT is placed upon the tines 46 of the fruit supporting arm 44. The diaphragm 42 is then inflated to securely hold the fruit in place, as shown in FIG. 8. As shown in FIG. 9, in the first stage of the slicing operation, the first slicing mechanism 52 moves vertically downwardly through the fruit to place five angled cuts in the fruit as shown in FIG. 10. At the next station F, a second cutting operation is performed to provide five additional cuts in the fruit as shown in FIG. 11. The fruit is then moved under the core cutter 54, and the cylindrical cutter 100 is moved downwardly over the tines 46, as shown in FIG. 13, with such cutter being continuously rotated so as to provide a good clean cut about the core of the fruit. The cylindrical cut mates with the inner edges of the previous cuts performed by the blades 72 so as to leave ten uniform segments—as illustrated in FIG. 14. Finally, as shown in FIG. 15, the diaphragm 42 is deflated, and the segments are allowed to drop away from the carrier with only the core being left thereon. This core is then removed at station J by a conventional core removing mechanism as previously described.

While the present mechanism utilizes two slicing heads each having five blades, it will be recognized that a greater number or lesser number of slicing heads may be utilized with different numbers and arrangements of blades thereof depending, of course, upon the size and type of fruit which is to be sliced.

Although the best mode contemplated for carrying out the present invention has been herein shown and described, it will be apparent that modification and variation may be made without departing from what is regarded to be the subject matter of the invention.

What is claimed is:

1. Apparatus for slicing a citrus fruit comprising means for supporting a peeled citrus fruit in a fixed position with its axial core in a predetermined spacial orientation, a slicing head comprising a head portion and a plurality of blades uniformly circumferentially spaced about the axis of said head with said axis being coincident with said core of said fruit, means for rigidly and immovably mounting each of said blades to said head portion, each of said blades being flat in a plane which extends parallel to but spaced from said axis of the head, means for moving said head in a straight line path along the axis thereof so that said blades pass through said fruit with none of the planes of the blades passing through said core or directly adjacent thereto whereby a plurality of uniform sections may be cut from said fruit with all of the cuts passing through the radially extending membranes of the fruit at a relatively wide angle.

2. Apparatus for slicing a citrus fruit according to claim 1 including a second slicing head having a plurality of blades uniformly circumferentially spaced about the axis of said head, said blades being similar to and being spacially oriented similarly to the blades of the first slicing head, means for relatively moving said fruit supporting means to said second slicing head after said fruit has been cut by said first slicing head, and means for moving said second slicing head along the axis thereof so that the blades pass through said fruit in positions spaced circumferentially midway between the cuts made by said first slicing head.

3. Apparatus for slicing a citrus fruit according to claim 1 including a generally cylindrically shaped coring mechanism for cutting a cylindrical path through said fruit about the core thereof, said cylindrical path intersecting the inner ends of the cuts made by said blades.

4. Apparatus for slicing fruit according to claim 3 including means for rotating said coring mechanism about the longitudinal axis thereof.

5. Apparatus for slicing fruit according to claim 1 wherein said fruit supporting means is positioned so that the core of said fruit is oriented vertically and wherein said slicing head is reciprocated vertically through said fruit.

6. Apparatus for slicing fruit according to claim 5 wherein said fruit supporting means comprises a plurality of vertically arranged tines positioned so as to project into said fruit in surrounding relationship to said core thereof.

* * * * *